US010229162B2

United States Patent
Heinz et al.

(10) Patent No.: US 10,229,162 B2
(45) Date of Patent: Mar. 12, 2019

(54) COMPLEX EVENT PROCESSING (CEP) BASED SYSTEM FOR HANDLING PERFORMANCE ISSUES OF A CEP SYSTEM AND CORRESPONDING METHOD

(71) Applicant: SOFTWARE AG, Darmstadt (DE)

(72) Inventors: Christoph Heinz, Weimar-Niederweimar (DE); Michael Cammert, Wettenberg (DE); Jürgen Krämer, Marburg (DE); Daniel Schäfer, Ober-Mörlen (DE); Tobias Riemenschneider, Schwalmstadt (DE)

(73) Assignee: SOFTWARE AG, Darmstadt (DE)

( * ) Notice: Subject to any disclaimer, the term of this patent is extended or adjusted under 35 U.S.C. 154(b) by 685 days.

(21) Appl. No.: 14/460,687

(22) Filed: Aug. 15, 2014

(65) Prior Publication Data

US 2015/0286684 A1    Oct. 8, 2015

(30) Foreign Application Priority Data

Nov. 6, 2013   (EP) .................................... 13191743

(51) Int. Cl.
  *G06F 17/00*   (2006.01)
  *G06F 17/30*   (2006.01)
  (Continued)

(52) U.S. Cl.
  CPC ...... *G06F 17/30516* (2013.01); *G06F 11/328* (2013.01); *G06F 11/3409* (2013.01);
  (Continued)

(58) Field of Classification Search
  CPC ........................................... G06F 17/30
  (Continued)

(56) References Cited

U.S. PATENT DOCUMENTS 7,826,990 B2    11/2010  Nasle et al.
2006/0064481 A1*  3/2006  Baron ................ H04L 41/0886
                                                              709/224

(Continued)

FOREIGN PATENT DOCUMENTS

EP        2 560 106         2/2013

OTHER PUBLICATIONS

Search Report dated May 22, 2014 in corresponding European Application No. 13191743.7, pp. 1-9.

(Continued)

*Primary Examiner* — Apu M Mofiz
*Assistant Examiner* — Farhad Agharahimi
(74) *Attorney, Agent, or Firm* — Nixon & Vanderhye P.C.

(57) ABSTRACT

Certain example embodiments relate to a system (1) for handling performance issues of a production Complex Event Processing, CEP, system (2) during runtime. The production CEP system (2) includes at least one event source, at least one continuous query and at least one event sink. The system (1) includes: at least one monitoring sensor for producing a stream of status events relating to the production CEP system (2); and a monitoring CEP system (10) for executing at least one continuous analysis query on the stream of status events to produce a stream of monitoring events. The stream of monitoring events indicates performance issues of the production CEP system (2) relating to the throughput, the latency, and/or the memory consumption of the production CEP system (2).

19 Claims, 8 Drawing Sheets

Figure 1:
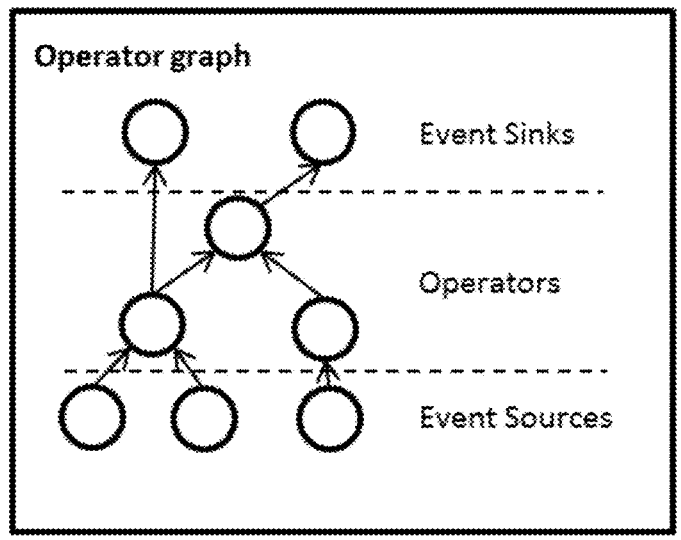

(51) Int. Cl.
*G06F 11/34* (2006.01)
*G06F 11/32* (2006.01)
*G06F 11/30* (2006.01)

(52) U.S. Cl.
CPC ...... *G06F 11/3452* (2013.01); *G06F 11/3476* (2013.01); *G06F 17/30427* (2013.01); *G06F 17/30474* (2013.01); *G06F 17/30958* (2013.01); *G06F 11/3096* (2013.01); *G06F 11/3419* (2013.01); *G06F 11/3447* (2013.01); *G06F 2201/80* (2013.01); *G06F 2201/805* (2013.01); *G06F 2201/86* (2013.01); *G06F 2201/865* (2013.01); *G06F 2201/88* (2013.01)

(58) Field of Classification Search
USPC .......................................................... 707/769
See application file for complete search history.

(56) References Cited

U.S. PATENT DOCUMENTS

| | | | |
|---|---|---|---|
| 2008/0086469 A1 | 4/2008 | Gu et al. | |
| 2010/0030896 A1* | 2/2010 | Chandramouli | G06F 17/30516 709/224 |
| 2010/0306709 A1* | 12/2010 | Lynch | G06F 17/30516 715/854 |
| 2011/0093631 A1* | 4/2011 | Gerea | G06F 9/542 710/104 |
| 2011/0283144 A1 | 11/2011 | Nano et al. | |
| 2011/0283239 A1 | 11/2011 | Krishnan et al. | |
| 2012/0110599 A1 | 5/2012 | Schöning | |
| 2013/0024442 A1* | 1/2013 | Santosuosso | G06F 17/30424 707/720 |
| 2013/0290966 A1 | 10/2013 | Branson et al. | |
| 2013/0346390 A1* | 12/2013 | Jerzak | G06F 17/30103 707/719 |

OTHER PUBLICATIONS

Waldemar Hummer et al., "Dynamic Migration of Processing Elements for Optimized Query Execution in Event-Based Systems," Jan. 1, 2011, pp. 451-468.
Bartosz Balis et al., "On-Line Grid Monitoring Based on Distributed Query Processing," Oct. 31, 2013, pp. 131-140.
U.S. Appl. No. 13/928,842, in the name of Michael Gessmann, filed Jun. 27, 2013.
Cammert, M. et al., "Dynamic Metadata Management for Scalable Stream Processing Systems", (printed on Jul. 25, 2014), 10 pages.
Fülöp, L.J. et al., "Predictive Complex Event Processing: A conceptual framework for combining Complex Event Processing and Predictive Analytics", (printed on Jul. 25, 2014), 6 pages.
Hoßbach, B. et al., "Reactive cloud monitoring with Complex Even Processing", Database Spectrum, (2012), 12:33-42, and Translation, 20 pages.
Leitner, P. et al., "Application-Level Performance Monitoring of Cloud Services Based on the Complex Event Processing Paradigm", (printed on Jul. 25, 2014), 8 pages.
Michlmayr, A. et al., "Comprehensive QoS Monitoring of Web Services and Event-Based SLA Violation Detection", W4SOC, (Nov. 30, 2009), 6 pages.
Nguyen, F. et al., "Information System Monitoring and Notifications Using Complex Event Processing", BCI, (Sep. 16-20, 2012), pp. 211-216.
Dos Santos Teixeira, P.H. et al., "HOLMES: An event-driven solution to monitor data centers through continuous queries and machine learning", DEBS, (Jul. 12-15, 2010), pp. 216-221.

* cited by examiner

COMPLEX EVENT PROCESSING (CEP) BASED SYSTEM FOR HANDLING PERFORMANCE ISSUES OF A CEP SYSTEM AND CORRESPONDING METHOD

This application claims priority to EP Application No. 13 191 743.7 filed 6 Nov. 2013, the entire content of which is hereby incorporated by reference.

1. TECHNICAL FIELD

Certain example embodiments generally relate to the handling of performance issues of Complex Event Processing (CEP) systems and more particularly to a corresponding CEP-based system and method.

2. BACKGROUND AND SUMMARY

Nowadays, modern computing systems have to deal with an ever-increasing volume of data. Complex Event Processing (CEP) is a processing paradigm designed to cope with such increasing volumes of data. CEP aims at processing and analyzing streams of data as the data is coming in, so that opportunities or threats can be detected and appropriate actions can be triggered fast. CEP systems use continuous queries to analyze the streams in a real-time manner, derive insights continuously, and forward these insights directly to the corresponding consumer(s). For example, by analyzing streams of credit card transactions in a real-time manner, potential fraud attempts can be discovered directly and the corresponding credit card can be disabled to avoid further damage. Other application scenarios that can benefit from CEP are for example in logistics, surveillance systems, algorithmic trading, web applications, and manufacturing systems.

A CEP system can be connected to data sources that continuously send data usually equipped with temporal information, so-called events. An event is for example an airplane landing, the blocking of a credit card transaction, a temperature reading from a machine, etc. These events stream into a CEP system and are analyzed by continuous queries. Such a query continuously processes incoming events, following a push-based processing paradigm, and corresponding results are directly pushed to follow-up consumers. One type of CEP systems uses SQL-based CEP engines, i.e. continuous queries are described in a SQL dialect. These engines typically resemble the mechanics of a database system: A textual query is translated into a combination of logical operations and for each of those logical operations a suitable physical implementation is chosen and then activated. Due to the sharing of sub-queries, the entirety of currently running queries constitutes an operator graph where the nodes refer to operators hosting the physical implementations and the edges to the flow of events between operators. Corresponding operators are e.g. a filter operator, a join operator, or an aggregation operator. In that context, the terms query graph and operator graph are used synonymously hereinafter. FIG. 1 illustrates an exemplary operator graph.

An important aspect of continuous queries is the handling of time as first-class citizen. Typically, a continuous query is equipped with a sliding time window, to which the current results refer. For example, compute the average transaction amount in the last hour. To compute these results, relevant events are temporarily stored in internal main memory data structures. If the input rates are high and the time window is large, these internal data structures can allocate large amounts of memory.

Another important aspect is the computational complexity of an operator, i.e. how much time does the actual processing of an event take. This latency can also be directly influenced by the size of the internal data structures, e.g. a theta-join has to traverse all elements in the data structure, which can be time-consuming for large status structures.

Typically, a CEP system executes a multitude of real-time analyses in parallel over transient streams of incoming data. Due to the brittle characteristics of the input streams, the long-running nature of the analyses, and the need for immediate analysis results, a CEP system is very demanding with respect to system resources such as memory, CPU, and bandwidth. The allocation of CPU and bandwidth resources mainly depends on the characteristics of the input streams and the computational complexity of the queries. The allocation of main memory mainly depends on the reference timeframe of the real-time analyses, e.g. the longer the time window of the query, the more data has to be typically kept in main memory. Thus, changing stream characteristics or queries entering/leaving the system has a high impact on the execution of the system and its resource allocation.

Due to the high security and business relevance of the analyses run by a CEP system, the system execution has to be robust and stable. Therefore, an elaborate governance technique for a CEP system which ensures a stable system execution by monitoring and adjusting it, is of utmost importance. In this context, the term "governance" refers to actions for handling performance issues of the CEP system, comprising monitoring the CEP system in order to detect performance issues during its runtime, adjusting and/or stabilizing the CEP system in order to resolve detected performance issues. The adjustment and stabilizing actions preferably encompass actions for handling performance issues which have already occurred, as well as performance issues which are likely to occur in the future. Such a technique has to be highly adaptive and scalable in order to adapt quickly to recent changes of the CEP system's workload. Besides the computation of suitable monitoring metrics a vital aspect is the presentation of the governance status to the user. This visualization has to allow for a simple yet comprehensive presentation of the system status, so that the user can quickly tackle critical queries. Another vital aspect is a robust adaptation of the system load which ensures that the system remains operational also under heavy load by suitably adapting the current query workload.

In the field of database technology, it is known to provide monitoring capabilities to observe the database status and to detect performance issues. This relates typically to monitoring system statistics, monitoring top SQL statements, monitoring current database sessions etc. This also typically includes the visualization of the acquired monitoring information. There are a multitude of tools for monitoring database systems available today. Nevertheless, as queries usually have a short runtime, analyzing query execution during query runtime is uncommon. Thus, the monitoring tools available for database management systems rely on a fundamentally different processing approach than CEP. A database system is designed for processing ad-hoc queries, which traverse a persistent data set and return all entries that fulfill the query criteria. In that context the response time of such a one-time query is the key metric for a monitoring component. By contrast, the monitoring of CEP systems has completely different requirements. In CEP, queries stay in the system and continuously produce results while transient events are streaming in and out. In that context the throughput of the query, the memory allocation of the internal data structures, and the latency are key metrics. Therefore, known monitoring approaches for database systems are hardly usable in the field of CEP.

A number of CEP engines are nowadays available on the market, including products of Software AG (Apama), StreamBase, ruleCore, IBM, TIBCO, SAP/Sybase/Coral8/Aleri, UC 4 Senactive, WestGlobal Vantify, Event Zero, Active Insight, Pion CEP, Esper/EsperTech, Red Hat Drools Fusion, Oracle, Microsoft Streamlnsight, Informatica, StarView, OMD Onetick CEP and Vitria M3O. Furthermore, Optimize for Infrastructure is a product of applicant designed to monitor IT products with a focus on webMethods products. It provides a set of preconfigured KPIs which are monitored and analyzed. In case of statistically significant deviations from normal KPI behavior alerts are raised.

The document "Comprehensive QoS Monitoring of Web Services and Event-Based SLA Violation Detection" of Michlmayr et al. (MW4SOC 2009) evaluates QoS monitoring of web services and the detection of SLA violations. Event processing technology is used to detect corresponding SLA violations and send notifications to consumers.

The document "Reaktives Cloud Monitoring mit Complex Event Processing" of HoBbach et al. (Datenbankspektrum (2012) 12) discusses a reactive monitoring of cloud environments with Complex Event Processing technologies.

The document "Dynamic Metadata Management for Scalable Stream Processing Systems" of Cammert et al. (SSPS 2007) describes a system for metadata management of stream processing systems, the academic term for CEP systems. Metadata are in this context particularly monitoring metrics such as the input rate of an operator. The document primarily focuses on the architectural integration of sensors that acquire metadata from operator nodes within a query graph, and also discusses metadata dependencies and metadata update concepts.

The document "HOLMES: An event-driven solution to monitor data centers through continuous queries and machine learning" of Teixeira et al. (DEBS 2010) addresses the monitoring of data centers by combining an Event-Driven Architecture, Complex Event Processing, and a specific unsupervised machine learning algorithm. User-defined rules are continuously checked for known problems. Anomalous patterns are computed by a machine learning algorithm that gets data normalized by a CEP engine as input.

The document "Predictive Complex Event Processing: A Conceptual Framework for Combining Complex Event Processing and Predictive Analytics" of Fiilop et al. (BCI 2012) discusses a conceptual framework combining Complex Event Processing and predictive analytics.

The document "Application-Level Performance Monitoring of Cloud Services Based on the Complex Event Processing Paradigm" of Leitner et al. (SOCA 2012) proposes to use Complex Event Processing to specify and monitor high-level performance metrics of applications. In the cloud context an existing cloud middleware is extended by event-based monitoring facilities. Corresponding components in the system emit status events which are then processed by a CEP engine to derive monitoring metrics. The main use is to enable expressive scheduling policies for the applications.

The document "Information System Monitoring and Notifications Using Complex Event Processing" of Nguyen et al. uses CEP in the context of information system monitoring and notifications. The main context is the monitoring of enterprise information systems.

U.S. Pat. No. 7,826,990 B2 discusses real-time monitoring and predictive analytics for an electrical system. A data acquisition component retrieves real-time measurements from the electrical system while a virtual system modeling engine predicts data outputs. The virtual system model is calibrated and synchronized with the real-time data to maintain an up-to-date model of the system and its sensors. An analytics engine checks for differences of real-time and predicted data output. Depending on the difference either an alert is raised or the system is re-calibrated.

U.S. patent application publications No. 2011/0283239 and 2011/0283144 concentrate on the visual analysis and debugging of CEP queries. An Event Flow Debugger is introduced that consists of multiple analysis modules that allow the debugging of a CEP query. An associated analysis UI displays the results of those analysis steps and allows for user interaction.

European patent application 2 560 106 of applicant focuses on the integration of forecasting functionality in the SQL interface of a CEP system.

European patent application 13169119.8 of applicant discusses the self-monitoring of a CEP system. It uses a feedback loop to detect several performance issues and error situations. The basic functionality is implemented by means of continuous SQL queries.

U.S. patent application publication No. 2012/0110599 of applicant discusses Quality of Service with respect to event processing. The event processing system prioritizes the processing of queries and/or events having assigned a QoS boundary like maximum reaction time or priority. The system processing is adapted so that the boundary conditions are met while at the same time increasing the processing rate.

However, none of the prior art has proposed a governance approach that addresses or solves the challenging requirements in the field of monitoring of CEP systems. Overall, the governance of a CEP system (i.e. both the detection of occurred or likely to occur performance issues as well as the initiating of corrective measures) as the key component of CEP system governance has to handle the following exemplary metrics for an operator/query: input rate, output rate, CPU utilization, latency, and allocated memory. As a CEP system is designed for high-volume, low latency application scenarios, a corresponding monitoring component has to deal with the following requirements: high volumes of incoming events per second, varying stream characteristics including sudden load peaks, varying workload in terms of input streams and queries entering/leaving the system and varying numbers of clients connecting to/disconnecting from the system. Also, a governance component for CEP systems should allow for a sophisticated real-time analysis of system status information and present the results in an intuitive manner to the user. Additionally, the system should react quickly to critical or potentially critical situations by asking for user input or taking autonomously corrective actions.

It is therefore the technical problem to provide a technique for handling performance issues of CEP systems which is fast, reliable and flexibly adaptable to the challenging demands of CEP systems, thereby at least partly overcoming the above explained disadvantages of the prior art.

This problem is according to one aspect of the disclosure solved by a system for handling performance issues of a production Complex Event Processing, CEP, system during runtime, wherein the production CEP system comprises at least one event source, at least one continuous query and at least one event sink. In the embodiment of claim 1, the system comprises:

a. at least one monitoring sensor adapted for producing a stream of status events relating to the production CEP system; and b. a monitoring CEP system adapted for executing at least one continuous analysis query on the stream of status events to produce a stream of monitoring events, wherein the stream of monitoring events indicates performance issues of the production CEP system relating to the throughput, the latency, and/or the memory consumption of the production CEP system.

Accordingly, the system of this embodiment is based on the concept of governing a CEP system during its execution (i.e. the "production CEP system") by means of CEP technology itself, thereby enabling to take advantage of the powerful capabilities of CEP for the handling of performance issues. To this end, the production CEP system is monitored by a second CEP system, namely the monitoring CEP system. Status information relating to the production CEP system is collected by monitoring sensors and fed into the monitoring CEP system. For example, the at least one monitoring sensor may be attached to an operator of the at least one continuous query of the production CEP system and is adapted for counting input and/or output events of the operator and/or for computing a memory consumption of the operator. It will be appreciated that the production CEP system can be configured to perform any sort of processing on collected sensor information, such as e.g. a CEP system operating in a logistics, manufacturing or surveillance system, a CEP system for detecting credit cards fraud attempts, or the like.

Using the collected status information, the monitoring CEP system is enabled to perform complex monitoring analyses using continuous analysis queries in order to detect performance issues of the production CEP system fast, i.e. nearly in real-time, as the production CEP system executes. Using a monitoring CEP system for monitoring the production CEP system has further advantages, e.g. that additional analysis queries may be added to the monitoring CEP system, so that the monitoring can be flexibly adapted to changed circumstances.

In a further aspect of the disclosure, the system may further comprise an analytics component adapted for analyzing the stream of monitoring events using stream mining and for generating at least one statistical model of the performance of the production CEP system. The system may also comprise a statistical model database adapted for storing the at least one statistical model generated by the analytics component, wherein the analytics component may then be further adapted for deriving a forecast of the status of the production CEP system based on the at least one stored statistical model and a current statistical model of the production CEP system. Accordingly, using stream mining techniques to derive statistical models representing the current, past and/or future forecasted status of the production CEP system allows for sophisticated analyses of the production CEP system's performance, as well as its probable future behaviour.

In another aspect of the disclosure, the system further comprises a graphical user interface (also referred to as "graph visualizer" hereinafter) adapted for indicating at least one identified performance issue of the production CEP system. The graphical user interface may be adapted for displaying the at least one continuous query of the production CEP system as an operator graph, wherein operators of the operator graph involving a performance issue are indicated. Accordingly, an operator or administrator of the production CEP system is enabled to obtain a comprehensive overview of the status of the production CEP system, which is the basis to take corrective actions in case of performance issues in a fast and reliable manner.

In yet another aspect, the system further comprises a system stabilization component adapted for indicating to a user a recommended action for resolving an identified performance issue of the production CEP system. Accordingly, the system of certain example embodiments might not only indicate the status of the production CEP system and possible performance issues, but also recommend actions for solving such performance issues. The recommended actions for resolving an identified performance issue of the production CEP system might include e.g. stopping the at least one continuous query of the production CEP system, moving the at least one continuous query of the production CEP system to another processing component, and/or modifying the at least one continuous query of the production CEP system. Modifying the at least one continuous query of the production CEP system may comprise reducing a window size of the at least one continuous query, reducing an output rate of the at least one continuous query, and/or removing event attributes not used by the at least one continuous query.

In addition or alternatively, the system stabilization component may be adapted for automatically initiating an action for resolving an identified performance issue of the production CEP system. Actions for resolving an identified performance issue of the production CEP system may be e.g. rejecting new input streams, continuous queries and/or query consumers of the production CEP system, executing a query optimizer, sorting a plurality of continuous queries of the production CEP system by memory consumption and stopping queries and/or moving queries to another processing component until memory consumption is in a reasonable range, and/or sorting input streams of the production CEP system by input rate and sorting a plurality of continuous queries of the production CEP system by output rate and stopping queries and/or moving queries to another processing component until bandwidth consumption is in a reasonable range.

Certain example embodiments also provide a method for handling performance issues of a production Complex Event Processing, CEP, system during runtime, wherein the production CEP system comprises at least one event source, at least one continuous query and at least one event sink, wherein the method comprises the following steps: producing a stream of status events relating to the production CEP system by at least one monitoring sensor; and executing, by a monitoring CEP system, at least one continuous analysis query on the stream of status events to produce a stream of monitoring events, wherein the stream of monitoring events indicates performance issues of the production CEP system relating to the throughput, the latency, and/or the memory consumption of the production CEP system.

Further advantageous modifications of embodiments of this method of are defined in further dependent claims.

Lastly, a computer program is provided comprising instructions for implementing any of the above described methods. The computer program may be stored to a non-transitory computer readable storage medium or the like and, when executed, may perform those and/or other instructions.

3. BRIEF DESCRIPTION OF THE DRAWINGS

Figure 2:
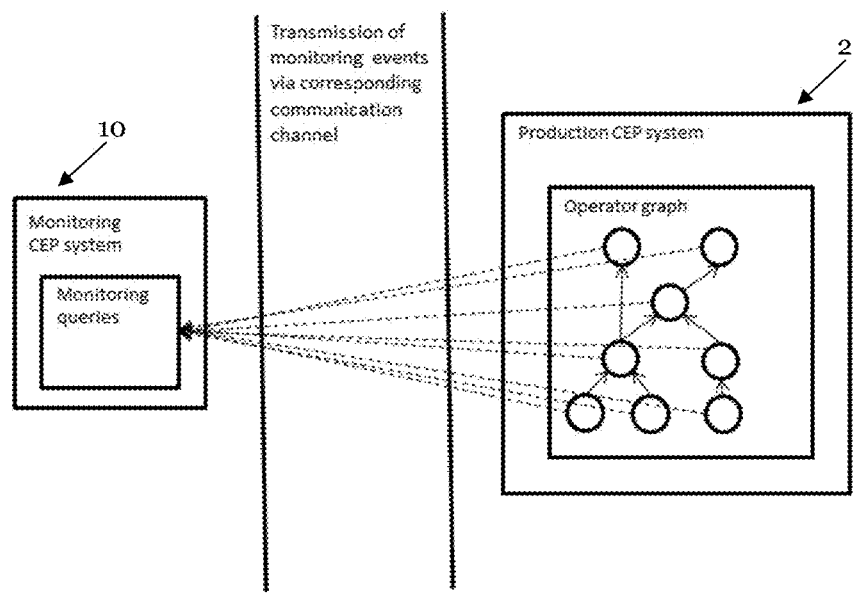
Figure 3:
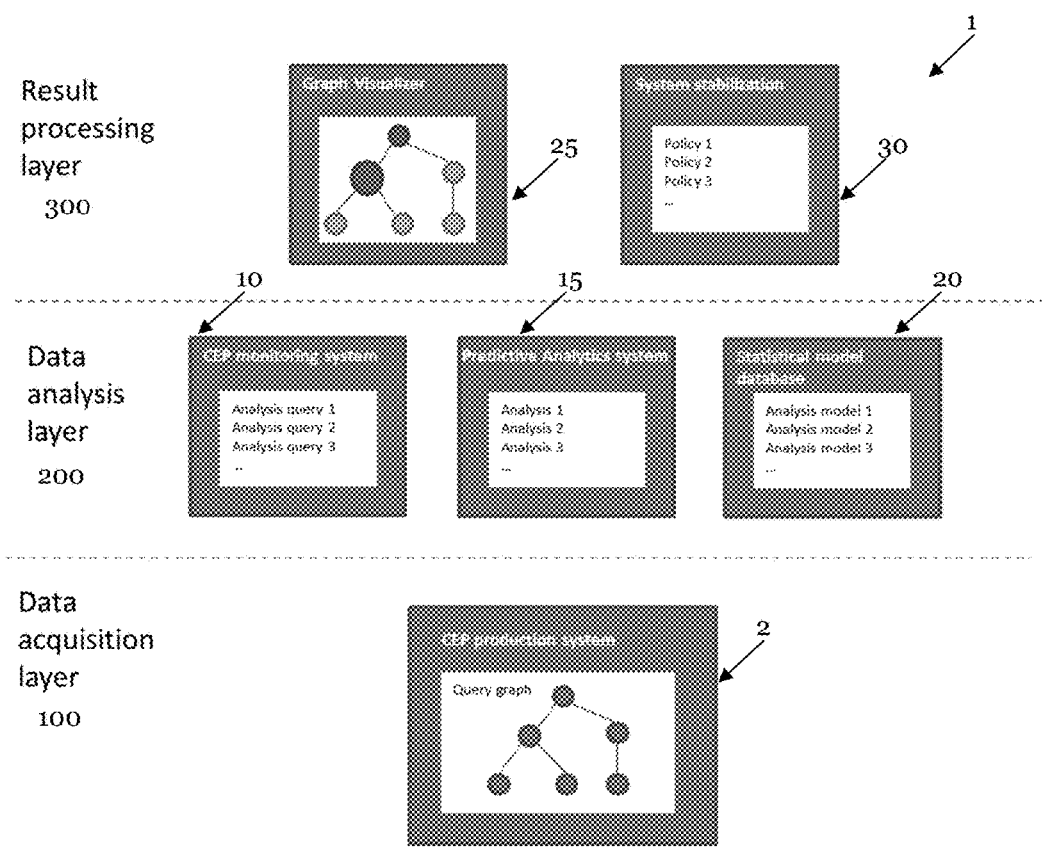
Figure 4:
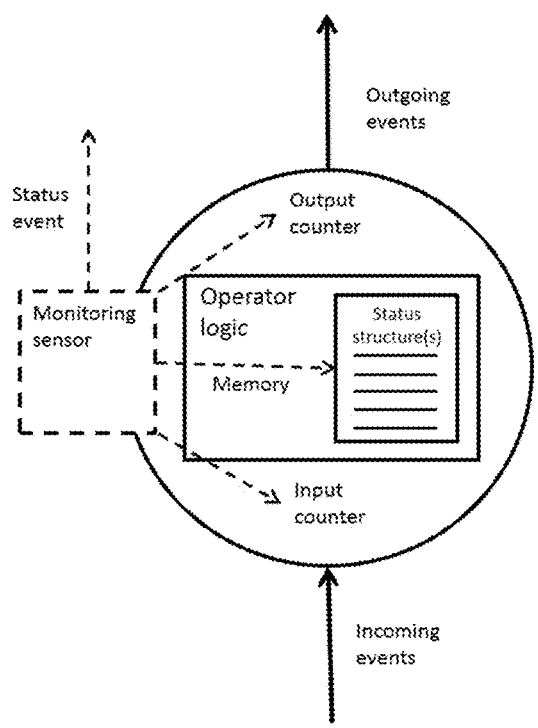
Figure 5:
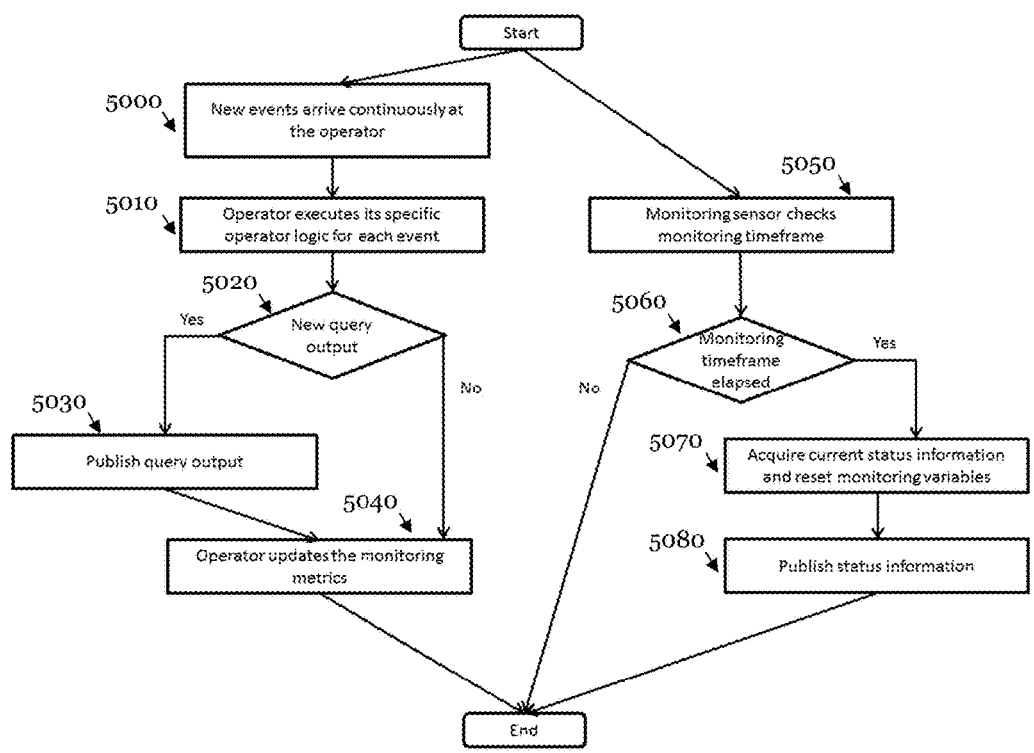
Figure 6:
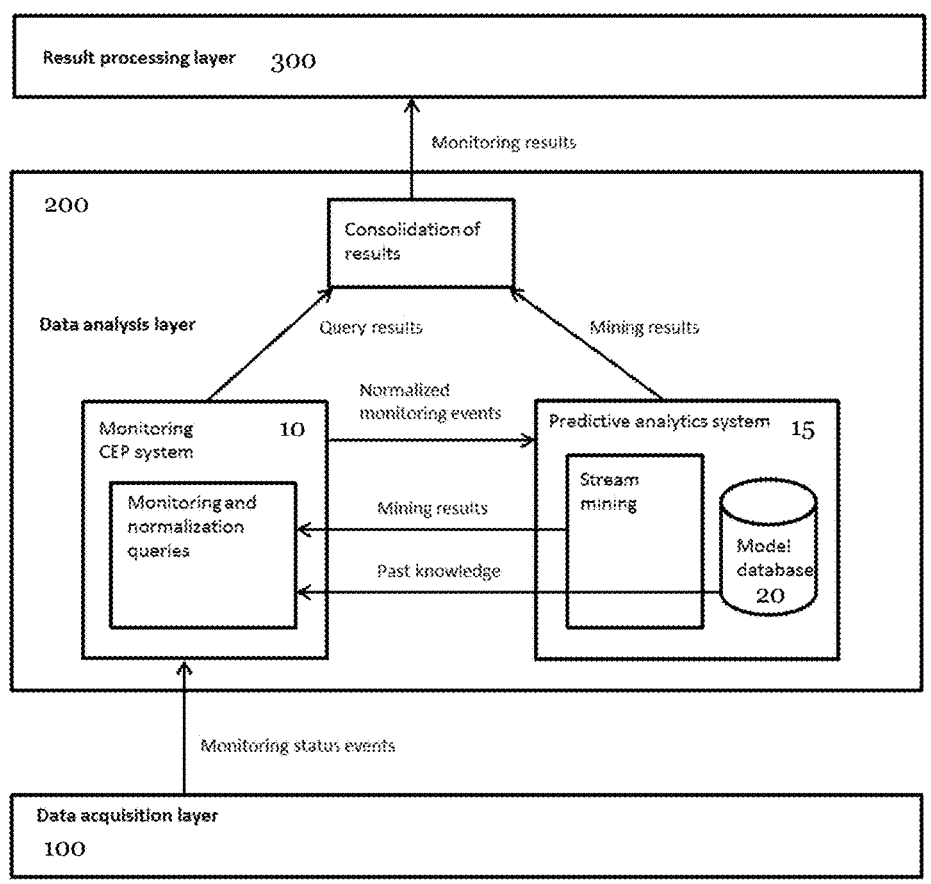
Figure 7:
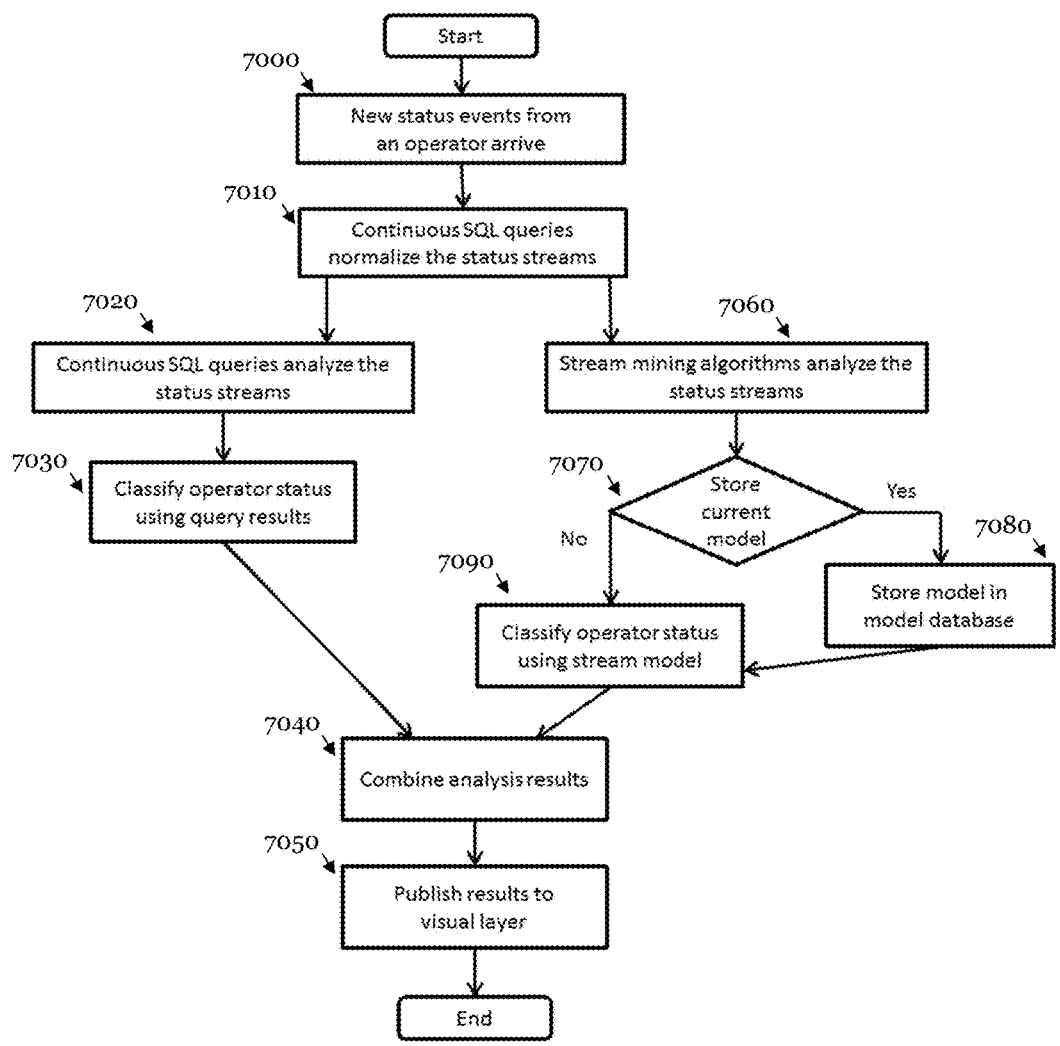
Figure 8:
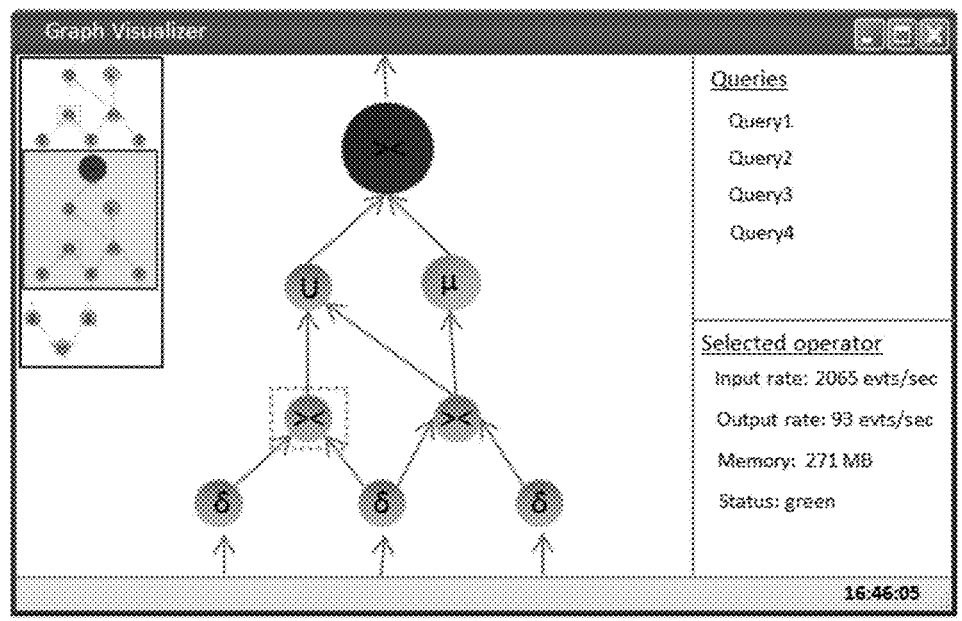
Figure 9:
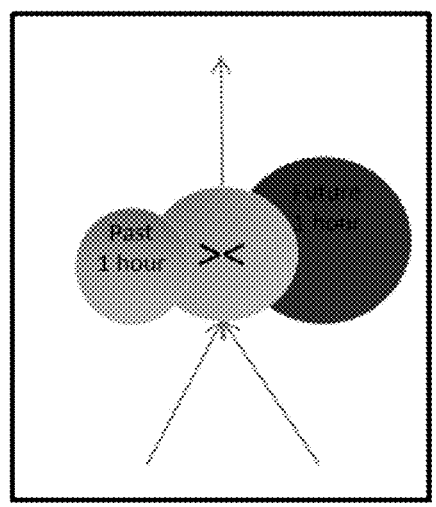
Figure 10:
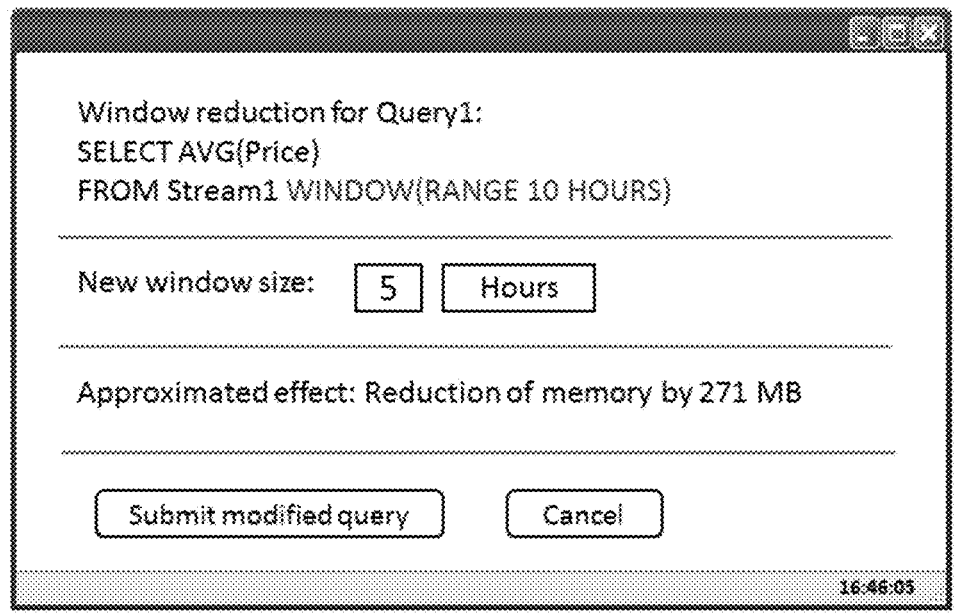

In the following detailed description, presently preferred embodiments are further described with reference to the following figures:

FIG. 1: An exemplary operator graph/query graph of a CEP system;

FIG. 2: A schematic illustration of the communication between a production CEP system and a monitoring CEP system according to an embodiment;

FIG. 3: A schematic overview of the architecture of a system according to an embodiment;

FIG. 4: A schematic overview of the acquisition of status information from an operator node according to an embodiment;

FIG. 5: A flowchart illustrating the processing of an operator according to an embodiment;

FIG. 6: A block diagram illustrating a data analysis layer of a system according to an embodiment;

FIG. 7: A flowchart illustrating the processing of the analysis layer of FIG. 6;

FIG. 8: A screenshot of an exemplary graph visualizer according to an embodiment;

FIG. 9: A screenshot of an exemplary operator status visualization according to an embodiment; and FIG. 10: A screenshot of a recommendation for query modification according to an embodiment.

4. DETAILED DESCRIPTION

Certain example embodiments provide unique techniques to allow for a governance of CEP systems. Certain example embodiments focus on the well-established class of CEP systems using a declarative query language as query interface. The most prominent representative for such a declarative query language is SQL. Therefore, the following considerations assume a SQL-based CEP system. However, similar considerations can be done for other declarative query languages. SQL-based CEP systems offer a SQL interface to the user which closely resembles the SQL interface of classical database systems. Due to the intended similarity to database systems and therefore the access to the results of decades of database research, SQL-based CEP systems allow for high performance and offer an intuitive approach for the specification of processing logic. Regarding system governance, they allow for a fine-granular monitoring of the corresponding queries and their components, which is the basis for a well-defined root cause analysis. Furthermore, the declarative query language SQL leaves the choice how to execute the queries to the system and therefore allows for corresponding optimizations, which is not possible with a procedural approach.

The following summarizes core problems a governance component for a CEP system has to deal with and the solutions proposed by certain example embodiments:

High data volume and changing workload: A CEP system typically executes a multitude of queries over input streams. The characteristics of an input stream can suddenly change, e.g. the number of orders for an item increases significantly after the price has been decreased. Also the query workload can change with queries entering or leaving the system, e.g. a new query counting the number of orders in the last hour is registered. To cope with such a brittle setting, a governance component has to monitor the queries in very fine-granular manner, e.g. measuring the memory allocated by a query only once an hour is not enough. Overall the governance component has to connect to a multitude of queries dynamically and will receive over those connections high volumes of status information for the currently active queries. As a solution to that demanding setup the use of a separate CEP system is proposed in certain example embodiments. This secondary CEP system (also referred to as "monitoring CEP system") is solely dedicated to monitor the primary CEP system (also referred to as "production CEP system"). Such a component, which leverages a CEP system internally, ensures that the potentially large volumes of status information delivered by the primary CEP system can be analyzed in real-time. This real-time analysis allows detecting system-critical situations instantaneously so that appropriate counteractions can be triggered immediately.

Prediction of critical situations: Besides the real-time analysis of the current system status quo the use of a predictive analytics component is proposed by certain example embodiments. This component leverages techniques from the area of predictive analytics to forecast future development of key system metrics like memory consumption. This prepares the ground for proactive stabilization actions. Such a prediction component can especially leverage recently proposed techniques from the area of stream mining, as these techniques can be evaluated incrementally over streaming data. Therefore, statistical models of the key metrics can be derived in real-time and used to predict near-future behavior. For example, the prediction component estimates that with a high probability the memory consumption of a query will exceed the 1 GB threshold in the next 10 minutes. Based on this information a corresponding corrective action can be triggered. In contrast to such stream mining techniques traditional data mining and forecasting techniques have typically high evaluation costs and thus are not suited for real-time analyses.

Visualization in governance cockpit: Instead of text messages and pure numbers for describing the system status quo, a new visualization approach is introduced by certain example embodiments. This approach relies on the common representation of continuous SQL queries as a query graph. While input streams and output sinks constitute bottom and top of the graph, the other nodes correspond to operators, e.g. join or aggregation operators. The visual representation of such a node depends on the current status. For example, if the node, compared to the other nodes, allocates a high amount of memory, it is marked red and it has a larger diameter than the other nodes. Besides displaying the as-is status in that way, additional graph visualization layers can be activated that simultaneously display the monitoring metrics from the near past and the near future. This gives the administrator a concise visual model of the current workload, where critical queries and their recent and future status can be directly pinpointed in a visual analytics approach.

System adjustment based on user input: The governance component of certain example embodiments continuously monitors the CEP system execution. In case a critical situation occurs or is likely to occur soon, the question is how the system deals with this situation. For that purpose an intelligent system adjustment framework based on user input is proposed by certain example embodiments. In case of a critical or potentially critical situation the system notifies the user. It analyzes the queries by their effects on the overall system health so that the user can directly detect the most resource-intensive queries. The user then selects a query and gets recommendations from the system about how the query should be adjusted in order to stabilize the system. Such a recommendation can be that the temporal range of the window is reduced, the query is stopped, or the query is moved to another system.

Autonomous system adjustment: Provided the user does not react on proposals for a system adjustment within a reasonable timeframe, the system of certain example embodiments autonomously starts corrective actions in case of critical situations. It may sort the queries by their severity and successively stops queries until the system gets into a stable state again. Notifications of the corresponding actions may be automatically sent to the user to ensure a transparent view on the current system activities.

In summary, a central concept underlying certain example embodiments relates to using CEP and stream mining to monitor a CEP system in real-time and using that information for visualization and (semi-) autonomous adaptation of the system load in a live manner, resulting in an intelligent governance framework for CEP systems.

In the following, a presently preferred embodiment is described with respect to a system 1 as schematically shown in FIG. 3. As can be seen, the system 1 of this embodiment has a layered architecture comprising a data acquisition layer 100, a data analysis layer 200 and a result processing layer 300, each of which will be described in the following.

Data Acquisition Layer 100

On the data acquisition layer 100, the production CEP system 2 is equipped with one or more sensors being connected to the operators of the current query graph. These sensors acquire status information of an operator in a configurable manner. This information is then sent to the monitoring CEP system 10. The monitoring CEP system 10 may reside directly besides the production CEP system 2, or may receive the status data remotely via a suitable transmission channel, such as a message bus or a direct TCP/IP-based communication. FIG. 2 illustrates the basic interaction between the production CEP system 2 and monitoring CEP system 10.

Accordingly, the starting point is a production CEP system 2 that is connected to input sources, has continuous SQL (or other) queries registered over those sources, and publishes the query results continuously to corresponding sinks. The entirety of sources, queries, and sinks constitutes a query graph (as schematically shown in FIG. 1). In this graph the sources are on the bottom and the sinks are on the top. Nodes in between as well as the connections between them and sources/sinks represent the physical operator implementation of the queries, following the well-established database mechanisms. Each of the nodes is equipped with a monitoring module (also referred to as "monitoring sensor") which acquires relevant status information of the operator and publishes it to the monitoring CEP system 10. To allow for maximum flexibility, this publishing can be decoupled from actual consumers by using an Event Bus, where event producers and consumers can flexibly subscribe and unsubscribe.

Overall, the monitoring sensors attached to nodes of the query graph constitute a set of data sources emitting streams of status information of the associated operator nodes. As capturing and transmitting this information also acquires resources, the monitoring CEP system 10 allows in certain embodiments configuring which status information is published and with which frequency. For example, by default an operator publishes each 30 seconds the number of events received and published in that time period. If now the system detects a strange behavior of these metrics, to allow for a deeper analysis, the time period may be reduced from 30 to 5 seconds and additionally the latency and the memory consumption of the operator are monitored. On the contrary, the monitoring can also be completely deactivated for performance reasons. An important invariant is that the (de)activation and configuration of the monitoring sensor attached to an operator can be done without stopping query execution. Another important aspect is that the monitoring sensors run asynchronously in order to not interfere with the normal operator processing logic.

Status information comprised in a stream of status events relating to the production CEP system 2 produced by the monitoring sensor(s) may comprise any combination of the following:

An identifier (ID) of the operator, e.g. identifier is 4177

Start and/or end timestamp of the monitored timeframe, e.g. from 13:42:21.483 UTC to 13:43:21.482 UTC Number of input events in the respective timeframe, e.g. 643,482 events Number of published output events in the respective timeframe, e.g., 412,109 events Number of events in internal status structures, e.g. 98,765 events Minimum, maximum, and/or average latency of events in the respective timeframe, e.g. minimum latency 1 millisecond, maximum latency 7 milliseconds, average latency 1.43 milliseconds A corresponding exemplary event is illustrated in XML below:

```
<eda:Event
xmlns:eda="http://namespaces.softwareag.com/EDA/Event
">
    <eda:Header>
    <eda:Type>{http://namespaces.softwareag.com/EDA}Opera
torStatus</eda:Type>
        <eda:Start>2013-11-
04T13:42:21.483Z</eda:Start>
            <eda:End>2013-11-04T3:43:21.482Z</eda:End>
            <eda:Kind>Event</eda:Kind>
    </eda:Header>
    <eda:Body>
        <p1:OperatorStatus
xmlns:p1="http://namespaces.softwareag.com/EDA">
            <p1:OperatorID>4711</p1:OperatorID>
    <p1:InputEventNumber>643482</p1:InputEventNumber>
    <p1:OutputEventNumber>413109</p1:OutputEventNumber>
    <p1:StatusEventNumber>98765</p1:StatusEventNumber>
            <p1:MinimumLatency>1</p1:MinimumLatency>
            <p1:MaximumLatency>7</p1:MaximumLatency>
    <p1:AverageLatency>1.43</p1:AverageLatency>
        </p1:OperatorStatus>
    </eda:Body>
</eda:Event>
```

In addition to such dynamic status information, the monitoring CEP system 10 may also comprise a repository of static information about the operator nodes, comprising any combination of the following:

Type of operator, e.g. aggregation operator

Queries using that operator, e.g. query2, query5

Schema information of input and output events, e.g. input events have 'ID' of type Integer and 'Value' of type Double while output events provide 'Variance' of type Double FIG. 4 illustrates the acquisition of status information in an operator node. An operator executes logic over incoming events and produces output events. Additionally, it stores events if necessary in internal status structures. The monitoring sensor tracks relevant metadata by counting e.g. input and output events as well as by computing the memory consumption of the internal status structures. Based on this information, the monitoring sensor produces status events for the corresponding operator being monitored.

An example of the processing performed by an operator according to an embodiment is illustrated in FIG. 5. As can be seen on the left hand side of FIG. 5, for incoming events (step 5000), the operator executes its specific operator logic (step 5010). If a query output event has been computed (step 5020), it is published (step 5030). Additionally, the operator may update its monitoring metric, such as increasing the input event counter (step 5040). In parallel to the processing of incoming events the monitoring sensor checks the monitoring timeframe (step 5050), as the monitoring information is preferably computed in a periodic fashion. If the timeframe is elapsed (step 5060), the monitoring sensor collects the current status information and resets the monitoring variables (step 5070). Then it publishes the collected status information as status event (step 5080).

Data Analysis Layer 200

Referring back to FIG. 3, the data analysis layer 200 is in charge of continuously analyzing the raw status information of operator nodes provided by the data acquisition layer 100. The monitoring CEP system 10 of certain example embodiments is adapted for (i) normalizing and consolidating the status events,
(ii) running one or more continuous analysis queries which check for correlations and/or known patterns, derive aggregated system statistics, and/or check for exceeded thresholds,
(iii) feeding the results continuously into a predictive analytics component 15. This component 15 uses techniques from the area of stream mining to detect clusters, frequent patterns, and/or data distributions in a real-time manner. The resulting statistical models are preferably stored in an analytics history database 20 and are preferably also provided as additional input to the monitoring CEP engine 10. By doing the latter, queries can compare recent values with current and past statistical models in order to forecast recent trends and/or changes. Thus, the system 1 of certain example embodiments can learn the typical behavior of the production CEP system 2. As an overall result, the data analysis layer 200 provides a consolidated and compact view of the current state of the production CEP system 2 as well as detected abnormal and/or critical patterns.

In summary, the data acquisition layer 100 provides status information for operators in the current query graph in a continuous fashion. Based on these streams of operator status events the data analysis layer 200 runs continuous monitoring analyses. For that purpose, a dedicated monitoring CEP system 10 is proposed as well as a predictive analytics system 15. The monitoring CEP system 10 is responsible for receiving the streams of status events, running analytic queries, and normalizing the data so that it can be used by the predictive analytics system 15.

Examples of continuous analysis queries to be executed by the monitoring CEP system 10 comprise without limitation:

Compute the average input and output rate in the last t minutes (where t is e.g. 10)
Check whether the number of elements in internal status structures is greater than x (where x is e.g. 1,000,000)
Check whether the average latency increased by more than x % (where x is e.g. 50) compared to the average latency of the previous timeframe t (where t is e.g. one hour).
Check when the input rate deviates by more than x standard deviations (where x is e.g. 2) from the average input rate with respect to a t hour window (where t is e.g. 1)
Check when the latency increased more than x times in a row (where x is e.g. 3)
Determine the operator with the maximum number of events in internal status structures with respect to the last t minutes (where t is e.g. 10)
Determine the top x operators with the highest output rates (where x is e.g. 5)
Report when an operator did not send status information in the expected timeframe Due to the SQL-based approach in the preferred embodiment, corresponding analysis queries can be easily expressed, e.g. such as SELECT OperatorId
FROM StatusEvents
WHERE StatusStructureSize >1000000

This exemplary query determines operators with more than 1 million events kept in internal status structures.

The above exemplary continuous analysis queries illustrate that the use of a monitoring CEP system 10 allows for a detailed root cause analysis of an operator/query as well as for an intuitive description of alert situations. This in turn is the foundation of a comprehensive governance system, as this information may be used for corrective actions.

Per default, one or more basic analysis queries may be registered by the monitoring CEP system 10 for each operator once the corresponding query is started by the production CEP system 2. To gain more insights into an operator, new logic may be easily integrated on demand by simply registering a new analysis query for that operator. Certain example embodiments comprise a template library with analysis queries covering standard analysis functionality, so that the user easily can investigate different aspects of a query and its operators. Additionally, the user may set up completely new analysis queries, which is facilitated by the SQL approach in the SQL-based embodiment.

Another task of embodiments of the monitoring CEP system 10 is to normalize and/or consolidate received status information. Such a "cleaned" stream of status events may then serve as input to the predictive analytics system 15. The predictive analytics system 15 is preferably responsible for deriving hidden knowledge, unknown patterns, and/or reasonable models for the monitoring metrics. The predictive analytics system 15 is based on techniques from the area of data mining and statistics. Due to the time-critical nature of the monitoring tasks and the highly volatile nature of the information gathered in CEP systems, stream mining techniques are leveraged. These techniques adapt well-known techniques from the area of data mining to the streaming scenario, i.e. the corresponding models can be computed in an online manner over streaming data (as e.g. described in the document "Predictive Complex Event Processing: A Conceptual Framework for Combining Complex Event Processing and Predictive Analytics" of Fülöp et al., BCI 2012).

To this end, certain example embodiments may employ the following techniques, or any combination thereof:

Clustering: Detect clusters of data where the data in each cluster is similar, but not similar to data in other clusters. This technique can be used to detect concentrations of monitoring metric values, which can be used to determine the complexity of queries.
Classification: Classify the monitoring data into reasonable classes, so that new measured values can be classified.

Time series analysis: Model a stream of numerical values as a mathematical time series. This approach can be used for deep statistical analysis of the monitoring metrics, e.g. detecting outliers, fundamental changes, concept drift, or seasonality.

For example, application of clustering technology to analyze the number of input events and the number of events kept in internal status structures reveals a cluster of operators under heavy load. They receive on average more than 45,300 input events per second and keep more than 1,223, 047 events in internal status structures. The administrator can use this information to reduce the load of these operators as this will improve bandwidth and memory consumption of the system.

Thus, the predictive analytics system 15 can be used to describe the current and/or forecasted status quo of the production CEP system 2 in a concise and well-defined manner as well as to detect unknown critical situations proactively.

In order to allow for a comparison of current models with past models, the predictive analytics system 15 may also comprise a predictive model database 20. This database 20 stores past statistical models with different time granularities. For example, the database 20 may comprise models for the previous day, two days before, previous week and/or previous month, thus providing a coarser granularity the longer the model refers to the past.

The combination of past and recent statistics inherently provides a learning mechanism, i.e. the data analysis layer 200 is able to continuously learn the typical behavior of the production CEP system 2's metrics.

FIG. 6 illustrates a data analysis layer 200 of a system 1 according to an embodiment with the above-described components. A flowchart illustrating the processing of the data analysis layer 200 is shown in FIG. 7. As can be seen, when a new status event from an operator arrives (step 7000), it is normalized (step 7010) and analyzed (step 7020) by means of continuous queries. Based on the results the status of the operator is classified (step 7030). In parallel, stream mining algorithms analyze the event (step 7060). Optionally (step 7070), the current model is stored in the database (step 7080). Then, the operator status is classified based on that stream model (step 7090). Finally, the analysis results may be combined (step 7040) as follows. The continuous SQL queries deliver basic analytical results by filtering, aggregating and joining monitoring events. The corresponding results are combined with the statistical models in order to enrich them with more sophisticated statistics based on historic data. Thus, besides the current measurement also more detailed information about the typical behavior of that measurement is provided. Additionally, the current measurement can also be combined with the statistical models to derive new insights. For example, continuous queries derive the average number of events kept in internal status structures in the last hour. A corresponding statistical model describes the distribution of that number based on past measurements. The combination of that model with the current average reveals that it is an outlier as its probability for occurrence is below five percent. The analysis results are then published (step 7050) to the result processing layer 300, which will be explained in the following.

Result Processing Layer 300

The above explained data analysis layer 200 provides a detailed real-time analysis for the continuous queries executing in the production CEP system 2. On the result processing layer 300, these analysis results can then be processed in a system stabilization component 30 and/or a graphical user interface 25 (also referred to as "graph visualizer" 25). An administrator may use the components of the result processing layer 300 to govern the production CEP system 2, i.e. this is the main interface for governance.

The result processing layer 300 continuously receives the results of the data analysis layer 200 and is responsible for processing them. The graph visualizer component 25 is in charge of displaying the currently running query graph of the production CEP system 2 with the nodes laid out so that their current status is reflected. For example, an operator node with an abnormally high memory allocation may be marked red and may have a larger diameter than the other nodes. Additionally, for each node a graphical overlay can be activated showing the node status based on past and/or future status. A node currently marked yellow which is marked red for forecasted future status deserves for example further attention. In addition or alternatively, the system stabilization component 30 is in charge of handling critical situations reported by the data analysis layer 200. In a preferred embodiment, the system stabilization component 30 first contacts the user and describes the current situation and its severity. In that context, the currently most critical queries may be listed as well as a set of recommended actions how to reduce the severity of the queries, e.g. by reducing the window size of the query. If the production CEP system 2 is likely to become destabilized and the user does not take corrective actions in a reasonable timeframe, the system stabilization component 30 may autonomously execute corrective actions until the system is stabilized again.

In the following, the graph visualizer 25 and the system stabilization component 30 will be described.

Graph Visualizer 25

The graph visualizer 25 is a visual tool to support governance. The basic concept is to represent the entirety of queries running in the production CEP system 2 in an operator graph. Following the architecture of database systems, a SQL query in a CEP system is represented as an operator tree with each node representing a physical implementation of a SQL operator. Due to the sharing of sub-queries the entirety of queries constitutes a graph of operators.

The graph visualizer 25 preferably displays the entire graph. To facilitate root cause analysis, it preferably also allows selecting a subset of the queries so that only the corresponding sub-graph defining those queries is displayed. The main purpose of the graph visualizer 25 is to reflect current monitoring information in the query graph. As discussed above, each node in the operator graph is continuously monitored. This status information is also reflected in the query graph visualization. Each node currently classified as not critical is green. Each node with monitoring metrics above normal is yellow. Each node classified as critical is marked red. The severity of the red status may be captured by the diameter of that node. The more severe the status is, the higher is the diameter. This allows an administrator to check visually the current status of the production CEP system 2. FIG. 8 illustrates an exemplary screenshot of the graph visualizer 25.

In order to allow for a more fine-granular analysis of the current status quo, the graph visualizer may provide an option to display for a selected node additionally the recent past and the approximated near future status. This additional information may be displayed also as a node besides the original node. For past and future status a separate node can be activated correspondingly, e.g. by providing a checkbox in the context menu of a selected operator node. This combined status of past, current, and future development of monitoring metrics offers the administrator means for a detailed analysis. FIG. 9 shows how the three layers of past, current, and future status of an operator node may be visualized simultaneously, wherein the left-most node representation ("past 1 hour") is marked green, the middle node representing the current status is marked yellow, and the right-most node representation ("future 1 hour") is marked red.

As another extension, a context menu of an operator node may also offer to display the development over time of a monitoring metric, e.g. memory, in an XY chart as well as other analytic results.

System Stabilization Component 30

The system stabilization component 30 complements the data analysis layer 200, both of them together constituting a comprehensive governance framework. The system stabilization component 30 provides means to stabilize the production CEP system 2. It preferably comprises a recommendation system that recommends the user how the system can be stabilized as well as an autonomous system that takes corrective actions.

As discussed above, the data analysis layer 200 continuously analyzes status information streams delivered by the production CEP system 2 to detect critical situations in a timely and ideally proactive manner. Depending on the criticality of detected problems, first the user is asked to take corrective actions.

System Adjustment Based on User Input

In case of a potentially critical situation the system 1 reports this status quo to the user. Besides details on that critical situation the system may also give recommendations to the user about how the system can be stabilized again.

If the situation is classified as critical the system may provide the user a list of currently active queries sorted by their criticality. For preferably each of these queries the system provides recommended actions, including for example Stopping a query In a clustered setup, move the query to a different cluster node Modifying the query Regarding query modification, the recommended actions are based on the query structure and the associated monitoring results, such as:

Reduction of allocated memory: Reduction of window size to reduce the memory allocated by the internal data structures Reduction of query output rate: Reduction of output granularity, e.g. only publish a result once a minute, to reduce the output rate Reduction of memory: Inclusion of a projection operator that removes all event attributes not being accessed in the query; this can reduce the memory allocated in internal data structures Reduction of input rate: Inclusion of a filter operator that filters out events that are no more needed in further query processing Reduction of CPU utilization: Listing of operators with highest CPU utilization Since these actions typically require additional input by the user, the system makes a recommendation and dependent on the type of recommendation a corresponding user interaction is triggered. This user interaction can be presented in the form of a user interface wizard. Such a wizard presents details on the query, the proposed action, and the expected results of that action. The wizard may be incorporated into each kind of user interface for administrators, e.g. it can be also part of an administration application on a mobile device. For example, for the reduction of the window size a wizard can be presented as is exemplarily shown in FIG. 10.

In addition to the recommendation, the system may also, if possible, offer estimates of the effects of the corrective actions, e.g. reducing the window size releases a certain amount of main memory. These recommendations allow the user to quickly detect hot spots and to correct the associated queries. Internally the system waits for user input for a defined period of time. If this time period is elapsed without user input or the situation is really critical, the system may take corrective actions autonomously.

Autonomous System Adjustment

The system may autonomously stabilize the production CEP system 2. Examples of associated corrective actions comprise any of:

Rejection of new input streams, queries, and query consumers

Execution of a query optimizer to optimize query execution based on latest runtime statistics Limited memory: Sort queries by memory consumption. Successively stop queries/move to another cluster until the memory status is green again.

Limited CPU: Sort queries by CPU utilization. Successively stop queries/move to another cluster until the CPU status is green again.

Limited bandwidth: Sort input streams by their input rate and queries by their output rate. Successively stop queries/move to another cluster until the bandwidth status is green again.

Pileup on output side due to slow event-consuming sink: The publishing of query output can be decoupled from the consumption of the results by a temporarily slow sink.

The execution of these corrective actions may be accompanied by notifications to the user that inform about the corresponding actions.

Extensions to the Governance Framework

Furthermore, certain example embodiments of the system 1 may comprise any combination of the following additional functionality:

Estimation of cost model: As in database systems, SQL-based CEP systems also can be equipped with a cost model for queries. This cost model describes the cost of a query for parameters like input rate and selectivity. This information can be leveraged by a query optimizer to assess different physical implementations of a query workload. The parameters of the cost model can be determined by the previously described data analysis layer 200. As the analysis layer 200 guarantees up-to-date analysis results for the cost models, the query optimizer has a well-founded base for adapting the queries to latest trends.

Assessment of new queries: The predictive analytics component 15 analyzes the queries and stores derived statistical models in a model database 20, as explained above. These models as well as the aforementioned cost model can be used to estimate the impact of including the new query in the current query graph.

Governance in a cluster: The previous discussion concentrates on governance of a single production CEP system 2. The same approach can be used for the governance/monitoring of a plurality of production CEP systems 2. In that context the system stabilization component 30 can also balance the load between the production CEP systems 2. If one production CEP system 2 runs out of resources, the system stabilization component 30 may move resource-intensive queries to other cluster nodes 2 having a moderate load profile.

Stability of the monitoring CEP system 10: The monitoring CEP system 10 typically has to deal with high volumes of status information from the production CEP system 2. Thus, it might also run short of resources. To adapt to such a situation the system 1 of certain example embodiments may adjust the update granularity of the monitoring sensors in the operator nodes of the production CEP system 2. By doing so, the input rates for the monitoring CEP system 10 are reduced and resources are released.

Prioritization of queries: The system may offer the user to assign priorities to queries. Then, the system tries to execute queries with a high priority as long as possible also if they are resource-intensive. In that context, the concepts laid out in US 2012/0110599 of applicant may be incorporated.

Detailed Comparison to Prior Art Approaches

Monitoring of CEP engines

Oracle: The CEP product of Oracle offers several monitoring features. Java Management Extensions (JMX) can be used to connect to an Oracle CEP Server. Once connected to the Server using that API, throughput and latency of an Oracle CEP component can be monitored. These runtime metrics can either be pulled or pushed via a notification listener. However, this approach does not conceive that a CEP system is used for computing runtime statistics. Additionally, it is also not conceived how to implement/integrate new and more complex monitoring functionality, e.g. computing the standard deviation and the maximum throughput over the last 10 minutes and check whether it has increased by more than 10% compared to the values of the previous hour. This is one of the benefits of certain example embodiments, namely that using a CEP system 10 to monitor a CEP system 2 allows to flexibly define new, sophisticated monitoring logic, enriched by a predictive analytics component 15. The Oracle CEP system also offers an Oracle CEP Visualizer. This visualizer displays the queries in a query graph. However, it does not display past, current, and future runtime metrics in one UI. Additionally, no recommendation system or automated decision framework is conceived to restore system stability.

Microsoft StreamInsight: The server offers an API to obtain diagnostic views and the StreamInsight Event Flow Debugger to visualize analysis results in a GUI. A number of simple metrics is offered like memory usage, output counts, latency. Regarding the disadvantages of this approach the same holds as for the previously discussed Oracle CEP Server, namely flexibility of monitoring logic, visualization based on development of metrics, and restoring the system stability automatically or based on user input.

StreamBase: StreamBase includes some monitoring capabilities, but lacks the same features as Oracle's and Microsoft's CEP products explained above.

Monitoring with Optimize for Infrastructure of applicant: Optimize for Infrastructure focuses on usage for web-Methods products. It is not designed to monitor in a very fine-granular manner nodes in an operator graph of running CEP queries. It is not designed to support a push-based processing of large volumes of status events. It does not use a predictive analytics component to forecast future system behavior. Alerts are raised in critical situations, but the system does not offer the user suitable options to restabilize the system nor autonomously takes corrective actions. It does not offer a visual cockpit that visually summarizes the system status including past, current, and future status.

Academic publications:

"Reaktives Cloud Monitoring mit Complex Event Processing" of Hoßbach et al. (Datenbankspektrum (2012) 12) proposes to monitor a cloud computing environment based on CEP technology. One requirement of cloud monitoring is to react autonomously to the results of analyses. Such an action framework is connected to a broker. Such actions are to determine and execute corresponding measures. For that functionality techniques from the area of data stream mining are proposed. However, the disclosed actions are solely dedicated to cloud monitoring. Further, forecasting is described as one requirement to detect future events, but no technical solution is disclosed. Visualization for displaying the CEP results is mentioned, but not discussed in detail.

"Dynamic Metadata Management for Scalable Stream Processing Systems" of Cammert et al. (SSPS 2007) does not discuss the following aspects: use of a CEP system and predictive analytics as monitoring component, elaborate visualization of query graph, recommendation system and action framework for system stabilization.

"HOLMES: An event-driven solution to monitor data centers through continuous queries and machine learning" of Teixeira et al. (DEBS 2010) addresses the monitoring of data centers by combining an Event-Driven Architecture, Complex Event Processing, and a specific unsupervised machine learning algorithm. User-defined rules are continuously checked for known problems. Anomalous patterns are computed by a machine learning algorithm that gets data normalized by a CEP engine as input. The detected problems are then visualized in live dashboards. Even though this work picks up the idea of CEP for monitoring and machine learning for detecting abnormal patterns, it does not discuss the case of monitoring a CEP system by means of CEP and predictive analytics. It also does not discuss a visualization layer as discussed in this work as well as a recommendation and automated decision framework.

"Predictive Complex Event Processing: A Conceptual Framework for Combining Complex Event Processing and Predictive Analytics" of Fülöp et al. (BCI 2012) does not address the use of a framework for monitoring a CEP system as well as a visualization and recommendation framework.

"Application-Level Performance Monitoring of Cloud Services Based on the Complex Event Processing Paradigm" of Leitner et al. (SOCA 2012) does not conceive the monitoring of a CEP system, the use of predictive analytics, as well as the visualization and recommendation aspects.

"Information System Monitoring and Notifications Using Complex Event Processing" of Nguyen et al. does not address monitoring of CEP system, use of predictive analytics, visualization of results and recommendation and automated decision framework.

Related patents

U.S. Pat. No. 7,826,990 B2 does not address the monitoring of a CEP system using another CEP system and predictive analytics, visualizing past, current and future metrics simultaneously, a recommendation engine giving the user recommendations how to improve the query, an autonomous system adaptation that drops queries until system is stabilized again.

European patent application 13169119.8 of applicant discusses the self-monitoring of a CEP system using a feedback loop. Not addressed is the monitoring of a CEP system and its currently running queries on a fine-granular level using another CEP system and a predictive real-time analytics component, visualizing past, current and future metrics simultaneously, a recommendation engine giving the user recommendations how to improve the query, an autonomous system adaptation that drops queries until system is stabilized again.

U.S. patent application publication No. 2012/0110599 of applicant addresses a different problem, namely ensuring that QoS conditions for event processing are met. It does not discuss the monitoring of a CEP system using another CEP system and predictive real-time analytics, visualizing past, current and future metrics simultaneously, a recommendation engine giving the user recommendations how to improve the query, an autonomous system adaptation that drops queries until system is stabilized again.

Exemplary Use Case

An exemplary use case described in the following relates to a CEP system for algorithmic trading in capital markets. However, it will be appreciated that the CEP system that is to be governed by means of the system of certain example embodiments can be configured to perform any sort of data, such as e.g. a production CEP system operating in a logistics, manufacturing or surveillance environment, or the like.

Algorithmic trading uses sophisticated algorithms to execute trades automatically. For that purpose, a Complex Event Processing system can be leveraged. In fact, that specific capital markets segment is one of the most prominent segments where CEP is used. Corresponding trading strategies are expressed with CEP queries and executed over streams of market data. For such a CEP-based trading system a robust and stable execution is of utmost importance as outages or delays quickly result in significant losses or missed opportunities due to trades not being executed. In this context certain example embodiments are of high relevance. A simple example shall illustrate its benefits.

A CEP system runs a set of CEP queries which implement trading strategies over large volumes of market data. The CEP system running the trading queries can be referred to as the production CEP or monitored CEP system. As already described, each operator of those queries is equipped with a monitoring sensor that sends status information of the operator to a separate CEP governance system. This system uses CEP and predictive analytics to analyze the system health, report that to the administrator, and provide means to re-stabilize the system.

In the working scenario, a trader enters a new CEP query 'OrderVolumeMonitor' to monitor trading volumes by computing the average order volumes for stocks with respect to a four week time window. Due to the long time window, the separate evaluation for each stock, and the massive amounts of market data streaming in per second, this query quickly consumes huge amounts of main memory. As a consequence the system may crash as it runs out of main memory. The proposed CEP governance approach can prevent that constellation. The central operator of the OrderVolumeMonitor query is an aggregation operator, whose internal status allocates an increasing amount of main memory. The aforementioned monitoring sensor continuously reports the memory size of the internal status to the CEP governance system. A monitoring CEP query (running in the CEP governance system) continuously checks whether that size has more than doubled in the previous hour. Another monitoring CEP query checks whether the size is above 1 gigabyte. In parallel, a mining model is derived based on this memory sizing situation. A time series model can be used that reveals trends and seasonality in the development of the memory size. Additionally a forecasting algorithm is applied to forecast future values.

On the visualization layer, the aggregation operator is marked yellow when the allocated memory size exceeds 1 gigabyte. The administrator can select that node and gets the information that the memory size of the internal status has more than doubled recently. To get more details he can activate past and future development. The mining model reveals that the memory size has a strong increasing trend. Combined with the forecasting technique, the memory size is likely to be greater than 1.5 gigabytes within the next 23 minutes. The system analyzes the OrderVolumeMonitor query to derive counteractions. To reduce the size of the internal state, the window size has to be adapted. Thus, the system recommends a reduction of the window size to one week instead of four weeks. As the administrator does not confirm that update within 20 minutes, the system autonomously stops that query and sends out a notification of that action and its reason. Overall, the risk of a system crash is prevented as enough main memory has been released.

It will be appreciated that as used herein, the terms system, subsystem, service, engine, module, component, programmed logic circuitry, and the like may be implemented as any suitable combination of software, hardware, firmware, and/or the like. For instance, the CEP systems may be implemented on computer systems in standalone and/or networked environments. Such computer systems may include at least one processor, memory, etc. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

Glossary

CEP (Complex Event Processing): A processing paradigm that describes the incremental, on-the-fly processing of event streams; typically associated with continuous queries that are continuously evaluated over event streams Stream Mining: Incremental, on-the-fly computation of statistical and/or analytic models of event streams; typically those models are approximate Production CEP system/monitored CEP system 2: The CEP system that is to be monitored Monitoring CEP system 10: The CEP system that is to monitor the production CEP system 2.

What is claimed is:

1. A system for handling performance issues of a production Complex Event Processing (CEP) system during runtime, wherein the production CEP system is configured to execute a continuous production query that includes a plurality of operators that are executed as part the continuous query, the system comprising:
 a processing system that includes at least one hardware processor, the processing system configured to:
  receive a stream of status events produced via a plurality of monitoring sensors that are each assigned to an operator of the continuous query, where each monitoring sensor is configured to acquire status information from a corresponding operator that is then included in the stream of status events;
  execute a monitoring CEP system that is configured to run at least one continuous analysis query on the stream of status events to produce a stream of monitoring events, wherein the stream of monitoring events indicates performance issues of the production CEP system relating to the throughput, the latency, and/or the memory consumption of the production CEP system;
  execute a system stabilization component that is configured to:
   in response to identification of a first performance issue indicated in the stream of monitoring events, (1) sort a plurality of continuous queries of the production CEP system based on memory consumption of the plurality of continuous queries, and (2) based on the sorted plurality of continuous queries, stop at least some of the plurality of continuous queries and/or move at least one query to another processing component, and
   in response to identification of a second performance issue indicated in the stream of monitoring events, (1) sort input streams of the production CEP system by input rate, (2) sort the plurality of continuous queries of the production CEP system by output rate, and (3) based on the sorted inputted streams and sorted plurality of continuous queries, stop and/or move at least one of the plurality of continuous queries to another processing component.

2. The system of claim 1, wherein the at least one monitoring sensor is attached to an operator of the at least one continuous query of the production CEP system and is configured to count input and/or output events of the operator and/or to compute a memory consumption of the operator.

3. The system of claim 1, further comprising an analytics component configured to analyze the stream of monitoring events using stream mining and to generate at least one statistical model of the performance of the production CEP system.

4. The system of claim 3, further comprising a statistical model database configured to store the at least one statistical model generated by the analytics component,
 wherein the analytics component is further configured to derive a forecast of the status of the production CEP system based on the at least one stored statistical model and a current statistical model of the production CEP system.

5. The system of claim 1, further comprising a graphical user interface configured to indicate at least one identified performance issue of the production CEP system.

6. The system of claim 5, wherein the graphical user interface is configured to display the at least one continuous query of the production CEP system as an operator graph, wherein operators of the operator graph involving a performance issue are indicated.

7. The system of claim 1, wherein the system stabilization component is further configured to: generate and output an indication of a recommended action for resolving an identified performance issue of the production CEP system.

8. The system of claim 7, wherein the recommended action for resolving an identified performance issue of the production CEP system is selected from the group comprising:
 stopping the at least one continuous query of the production CEP system,
 moving the at least one continuous query of the production CEP system to another processing component, and/or
 modifying the at least one continuous query of the production CEP system.

9. The system of claim 8, wherein modifying the at least one continuous query of the production CEP system comprises reducing a window size of the at least one continuous query, reducing an output rate of the at least one continuous query, and/or removing event attributes not used by the at least one continuous query.

10. The system of claim 1, wherein the system stabilization component is further configured to: execute a query optimizer.

11. A method for handling performance issues of a production Complex Event Processing (CEP) system during runtime, the production CEP system comprising at least one event source, at least one continuous query and at least one event sink, the method comprising:
 producing a stream of status events based on status data acquired by a plurality of monitoring sensors that are each attached to a different operator of the at least one continuous query of the production CEP system;
 executing, by a monitoring CEP system including at least one computer processor, at least one continuous analysis query on the stream of status events to produce a stream of monitoring events;
 based on the produced stream of monitoring events from the monitoring CEP system, adjust a parameter of at least one of the plurality of monitoring sensors to change how the corresponding monitoring sensor acquires the status information that is included in the stream of status events;
 executing, using the monitoring CEP system, a system stabilization component;
 using the system stabilization component for:
  identifying a first performance issue indicated in the stream of monitoring events and in response to identification of the first performance issue: (1) sorting a plurality of continuous queries of the production CEP system based on memory consumption of the plurality of continuous queries, and (2) based on the sorted plurality of continuous queries, stopping, using the system stabilization component, at least some of the plurality of continuous queries and/or moving at least one query to another processing component;
  identifying a second performance issue indicated in the stream of monitoring events and in response to identification of the second performance issue: (1) sorting input streams of the production CEP system by input rate, (2) sorting the plurality of continuous queries of the production CEP system by output rate, and (3) based on the sorted inputted streams and sorted plurality of continuous queries, stopping and/or moving at least one of the plurality of continuous queries to another processing component.

12. The method of claim 11, further comprising analyzing, the stream of monitoring events using stream mining and generating at least one statistical model of the performance of the production CEP system.

13. The method of claim 11, further comprising indicating, by a graphical user interface, at least one identified performance issue of the production CEP system; and/or indicating, by the system stabilization component, a recommended action for resolving an identified performance issue of the production CEP system.

14. A non-transitory computer readable storage medium tangibly storing a computer program for use with a processing system that includes at least one hardware processor, wherein the processing system is for use in handling performance issues of a production Complex Event Processing (CEP) system during runtime, the production CEP system is configured to execute a continuous production query that includes a plurality of operators that are executed as part the continuous query, the computer program comprising instructions that are configured to cause the processing system to:
  receive, via monitoring sensors that are each attached to an operator of the executing continuous production query on the production CEP system, a stream of status events, where each of the monitoring sensors is configured to acquire status information from an attached operator based on execution of the continuous production by the production CEP system, the acquired status information being included in the stream of status events;
  communicate the stream of status events to a monitoring CEP system that is separate from the production CEP system;
  execute, as part of the monitoring CEP system, a continuous analysis query on the stream of status events to thereby create a stream of monitoring events, wherein the stream of monitoring events are performance metrics of the production CEP system relating to the throughput, the latency, and/or the memory consumption of the production CEP system;
  determine, at the monitoring system and based on the stream of status events, whether the performance metrics exceed a threshold;
  in response to determination that the performance metrics exceed the threshold, cause at least one parameter of at least one of the monitoring sensors to be adjusted to change how the monitoring sensor acquires the status information, which is included in the stream of status events, from the corresponding operator of the executing continuous production query;
  identify a first performance issue indicated in the stream of monitoring events and in response to identification of the first performance issue: (1) sort a plurality of continuous queries of the production CEP system based on memory consumption of the plurality of continuous queries, and (2) based on the sorted plurality of continuous queries, stop, using the system stabilization component, at least some of the plurality of continuous queries and/or moving at least one query to another processing component; and
  identify a second performance issue indicated in the stream of monitoring events and in response to identification of the second performance issue: (1) sort input streams of the production CEP system by input rate, (2) sort the plurality of continuous queries of the production CEP system by output rate, and (3) based on the sorted inputted streams and sorted plurality of continuous queries, stop and/or move at least one of the plurality of continuous queries to another processing component.

15. The non-transitory computer readable storage medium of claim 14, wherein the adjusted at least one parameter changes a frequency in which the stream of status events are communicated from the corresponding monitoring sensor to the monitoring CEP system.

16. The non-transitory computer readable storage medium of claim 14, wherein the adjusted at least one parameter changes causes an additional property of the production CEP system to be monitored and corresponding monitoring sensor to produce status events related to the additional property.

17. The non-transitory computer readable storage medium of claim 14, wherein the adjusted at least one parameter causes a corresponding monitoring sensor to stop producing events and/or monitoring the corresponding operator.

18. The system of claim 1, wherein the processing system is further configured to: based on the produced stream of monitoring events from the monitoring CEP system, adjust a parameter of at least one of the plurality of monitoring sensors to change how the corresponding monitoring sensor acquires the status information that is included in the stream of status events.

19. The method of claim 11, wherein the system stabilization component is also used for:
  identifying a third performance issue related to consumption of events by the at least one event sink, and, in response to identification of the third performance issue, decoupling output of the at least one continuous query from the at least one event sink.

* * * * *